United States Patent
Schafer et al.

(10) Patent No.: US 8,066,224 B2
(45) Date of Patent: Nov. 29, 2011

(54) DECELERATION PLATFORM

(75) Inventors: David Richard Schafer, Bristol (GB); Gavin Borland, Bath (GB)

(73) Assignee: Babcock Integrated Technology Limited, Bristol (GB)

( * ) Notice: Subject to any disclaimer, the term of this patent is extended or adjusted under 35 U.S.C. 154(b) by 565 days.

(21) Appl. No.: 11/945,705

(22) Filed: Nov. 27, 2007

(65) Prior Publication Data
US 2008/0258011 A1   Oct. 23, 2008

(30) Foreign Application Priority Data
Apr. 17, 2007 (GB) .................................. 0707419.8

(51) Int. Cl.
*B64D 1/14* (2006.01)
(52) U.S. Cl. .................................. 244/138 R; 244/137.4
(58) Field of Classification Search ............. 244/138 R, 244/137.4, 17.15, 110 E, 137.3; 114/376
See application file for complete search history.

(56) References Cited

U.S. PATENT DOCUMENTS

| | | | | | |
|---|---|---|---|---|---|
| 1,107,109 | A | * | 8/1914 | Powers et al. | 114/376 |
| 3,190,587 | A | * | 6/1965 | Fries | 244/106 |
| 3,511,400 | A | * | 5/1970 | Oswald | 414/608 |
| 3,744,072 | A | * | 7/1973 | Pannell et al. | 114/344 |
| 5,816,536 | A | * | 10/1998 | Boullet | 244/138 R |
| 6,616,188 | B1 | * | 9/2003 | Jefferies et al. | 280/847 |

FOREIGN PATENT DOCUMENTS
GB        2151575 A   *   7/1985
* cited by examiner

*Primary Examiner* — Joshua Michener
*Assistant Examiner* — Brian M O'Hara
(74) *Attorney, Agent, or Firm* — Stites & Harbison PLLC; Douglas E. Jackson

(57) ABSTRACT

A platform for the aerial delivery of payloads into aquatic environments has a staged v cross-section formed by two walls extending from an end part. The portions of the two walls adjacent to the end part diverge from it at an angle $\theta$ and, together with the end part, form the tip of the platform. The remaining portions of the two walls, remote from the end part, form the body of the platform, and diverge at an angle $\phi$ that is greater than the angle $\theta$. When the platform is deployed onto the surface of a fluid, it initially experiences a period of low deceleration as the tip penetrates the surface, followed by a period of higher deceleration, as the body contacts the surface.

13 Claims, 3 Drawing Sheets

DECELERATION PLATFORM

FIELD OF THE INVENTION

1. Background of the Invention

The present invention relates to platforms for the aerial delivery of payloads into aquatic environments, and more particularly to those which seek to protect the payload from the force of the impact of the platform with the water.

2. Description of the Prior Art

It is commonly desirable to deploy a payload or store directly into an aquatic environment from a carrier, for example an aircraft or larger surface vessel. This is conventionally achieved by strapping or otherwise mounting the payload onto a flat platform, which is then deployed from the carrier. Often an extractor parachute is used in this regard to slow the descent of the platform.

A payload platform deployed in this way descends freely until impact with the water's surface. The water may well be extremely rough, and the payload itself may have been deployed from a substantial height. It is also likely that the payload is heavy. So, the force on impact with the water may be considerable. On impact with the water's surface, the force generated by the platform hitting the water is transmitted through the platform to the payload. This can result in damage to the payload, or even displacement of the payload from the platform. In rough water conditions, this separation becomes more likely, and the deployed platform is less stable.

SUMMARY OF THE INVENTION

Solutions to these problems have been sought. Particularly, by fashioning deployment platforms with a v-shaped cross-section, the force of impact with the water is spread more effectively, and potential damage to the payload is reduced. By the nature of the v-shape, these platforms also mean that in rough conditions the platform penetrates the water's surface to give a smooth load delivery.

However, these v-profiled platforms also face problems. If the angle of the v-profile is too acute, the platform may not be effectively decelerated on impact with the water, meaning that it may penetrate too deeply into the water and become submerged. This can cause damage to the payload, and can adversely affect the stability of the deployment. Also, the weight of the payload, if incorrectly mounted on the platform, may be sufficient to destabilise and even capsize the platform.

On the other hand, if the angle of the v-profile is too obtuse, the platform suffers a force on impact with the water great enough that the same force related problems occur as would with a flat-profiled platform.

The present invention seeks to address the drawbacks associated with existing deployment platforms, in particular those described above relating to v-profiled platforms.

At its most general, the present invention proposes that a platform which has a cross-section defining distinct sections, the sections having different wall gradients, will provide suitable mounting means for a payload. The present invention also proposes that by having a high wall gradient for a section near to the impact end of the platform and a low wall gradient at a section further from the impact end, the platform will have a staged deceleration on impact with a fluid.

The present invention seeks to provide, in a first aspect, a deceleration platform for altering the deceleration profile of a load dropped into a fluid, which may provide a platform which has a staged v cross-section, the cross-section having a rounded or pointed end part from which end part the walls of the platform diverge at an angle $\theta$, to form the sides of the tip section of the platform, following which the angle of divergence of the walls changes to an angle $\phi$ to form the sides of the body section of the platform, and wherein the angle $\phi$ is greater than the angle $\theta$.

In a second aspect, the present invention seeks to provide a method of deploying a load into a fluid which may provide the load with a staged deceleration profile on entry into the fluid, comprising the steps of mounting the load onto a deceleration platform, and deploying the loaded platform into the fluid, the platform having staged walls to provide, as the platform enters the liquid, a period of lower deceleration and a consecutive period of higher deceleration.

An object entering a fluid has a deceleration profile which describes the manner in which the velocity of the object alters as the object moves into the fluid. An object experiencing no deceleration on entry will have a flat (i.e. very shallow) deceleration profile. An object experiencing total deceleration on entry will have a vertical (i.e. very steep) deceleration profile. In this application, when reference is made to a shallow deceleration profile it is meant that the profile is closer to that of an object experiencing no deceleration than it is to that of an object experiencing total deceleration. When reference is made to a steep deceleration profile it is meant that the profile is closer to that of an object experiencing total, instantaneous deceleration than it is to that of an object experiencing no deceleration.

By altering the deceleration profile of an object entering a fluid, the manner of the deceleration of the object can be controlled. The present invention seeks to provide at least two stages to this deceleration process. The first stage, as the tip section of the deceleration platform impacts the water, provides low deceleration via a shallow deceleration profile. This is due to the relatively low angle of divergence of the walls of the tip section. The end of the tip section which will impact the fluid can be pointed or rounded. The low deceleration enables the tip to extensively penetrate the fluid surface, which in turn provides a smoother landing of the platform in rough conditions. The second deceleration stage occurs when the tip has completely penetrated the fluid and the wider body section begins to enter. The wider angle of divergence of the walls of the body section provides much more deceleration via a steeper deceleration profile, to bring the load to rest. During this section of deceleration, the tip section of the platform acts substantially as a 'keel', giving the platform stability and allowing for a stable delivery of the load in question.

The platform has a generally v-shaped cross-section, the cross-section having a rounded or pointed end part. From this end part the walls of the platform diverge at an angle $\theta$, to form the sides of the tip section of the platform. The angle of divergence of the walls then changes to an angle $\phi$ to form the sides of the body section of the platform. The angle $\phi$ is greater than the angle $\theta$. However, the angle $\phi$ is always less than 180°, as a completely flat body section would result in the platform experiencing an excessively high force when the body section contacts the fluid surface. These angles are shown schematically in an example form in FIG. 3. The transition of the angle of the walls from $\theta$ to $\phi$ may be immediate or gradual.

Effectively, the walls of the platform may each be considered to have two portions, these being a first portion adjacent to the end part and a second portion remote from the end part. The first portions of the walls form the sides of the tip section of the platform and have a narrow angle of divergence. The second portions of the walls form the sides of the body section of the platform and have a wider angle of divergence than the first portions of the walls.

Preferably the sides of the tip, and the sides of the body section, are of substantially constant divergence. That is, the angle θ does not vary substantially along the length of the walls of the tip section, and the angle ϕ does not vary substantially along the length of the walls of the body section. This means that the sides of the tip section are substantially flat, and the sides of the body section are also substantially flat. This is shown in example form in FIG. 3.

This describes what is referred to in this application as a 'staged' or 'compound' v-profile. By using the term 'v', the application is not limited to those cross-sectional profiles which have a pointed end part.

Preferably, the platform is made of a flexible material. If a flexible fabric, or a flexible sheet, is used, the platform is better described as a deceleration sheet.

When the platform is in the form of a flexible material, or a flexible sheet, the material or sheet is preferably attached to a rigid frame. The frame allows the material or sheet to form a staged v cross-section by way of cross members mounted on the frame. By running under a first cross member and over further cross members, the flexible material or sheet is forced into a taught staged v configuration. The material or sheet is preferably attached to the frame by a tensional connection. The tension in the material or sheet is preferably adjustable, preferably by adjustment of the tensional connection between the material or sheet and the frame. This adjustment allows the material or sheet to be tuned to suit the particular load mounted upon it.

The cross members of the frame preferably have a rounded cross-section. This means that flexible material running past a cross-member is less likely to be damaged by a sharp or rough edge of the cross member.

The present invention also relates to a method of deploying loads into fluid environments. By mounting such a load on the deceleration platforms described herein, a staged deceleration of the load on entry to the fluid can be achieved. The load can be mounted on the platform in any known way. The loaded platform can be deployed in any manner, to any chosen fluid environment. For example, the platform may be deployed from an aircraft to an aquatic environment. When a platform with staged walls in cross-section is used (such as those described in relation to the first aspect of the present invention), the deceleration profile of the load entering the fluid is similarly staged. The load experiences a period of lower deceleration consecutively followed by a period of higher deceleration. The lower deceleration is provided by the more narrowly angled tip section of the platform entering the fluid. The higher deceleration occurs when the tip has fully entered the fluid and the more broadly angled body section begins to enter the fluid.

BRIEF DESCRIPTION OF THE DRAWINGS

An example embodiment of the invention will now be described with reference to the accompanying drawings in which.

DETAILED DESCRIPTION

In an example embodiment of the present invention, the deceleration platform is formed from a flexible fabric material which is stretched over the cross members of a rigid frame to form a deceleration sheet.

Figure 1:
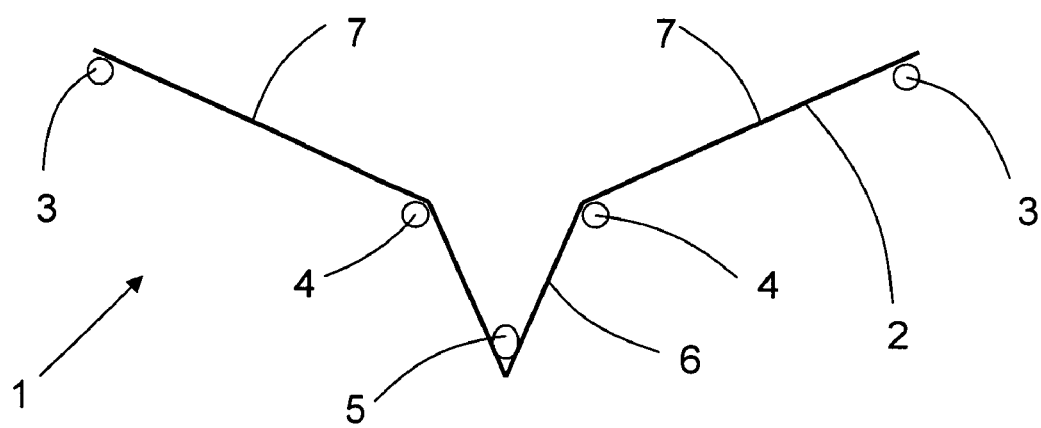
FIG. 1 shows a cross-section of a staged v profiled deceleration platform made from flexible fabric to form a deceleration sheet.
Figure 2:
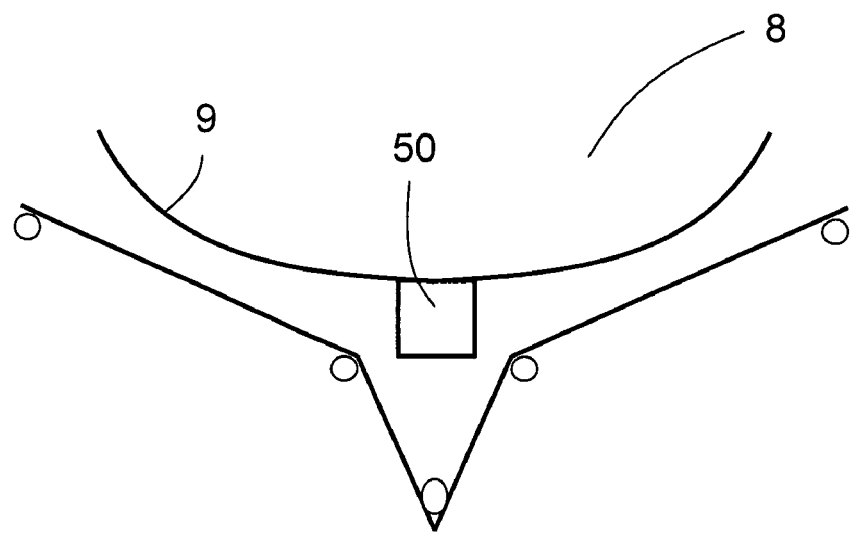
FIG. 2 shows a cross section of a deceleration sheet of FIG. 1, which has been loaded with a hard hulled craft.
Figure 3:
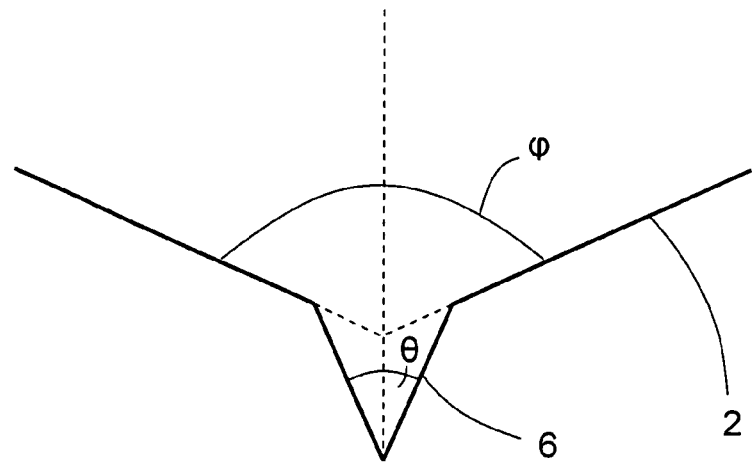
FIG. 3 shows the angles θ and ϕ in relation to a schematic example cross-section.

Deceleration sheet 1 shown in FIGS. 1 and 2 includes a flexible sheeting section 2 which is attached to a rigid frame (not shown). The flexible material can be of any suitable nature. Example materials include architectural textiles and rubber coated fabrics. The material of the rigid frame (not shown) is preferably rigid enough to provide a firm framework upon which the flexible sheet 1 can be mounted, and also light enough that the assembly is not of large weight. Such a large weight assembly would be uneconomical and potentially less effective in the present invention, as the increased mass of the frame will increase the force of impact of a platform dropped into a fluid.

The sheeting is tensioned by tubular elements 3 on each side of the frame. Any form of tensional attachment is suitable, however. Tension in the sheet is important for providing suitable support to a store placed onto it. This tension may be adjustable, and the system of adjustment can be of any known type. The sheeting passes over support elements 4 to each side of the middle of the frame, before running under a further element 5 towards the base of the frame (not shown). The arrangement thus provides a narrow angled tip section 6 which widens to a broader angled body section 7. The narrow tip section 6 would provide lower deceleration when the platform is dropped into a fluid, and the broader body section 7 would provide higher deceleration. The cross-member elements 3, 4, 5 are tubular in this embodiment, to lower the overall weight of the frame. This means that the end part of the platform, defined by the base element 5, is slightly rounded. The cross members 3, 4, 5 and the frame (not shown) itself can be of any substantially rigid material, for example tubular metal or composite materials such as fibre reinforced plastics and pultrusions.

FIG. 2 schematically shows a hard hulled craft 8 supported on a deceleration sheet 1. The hull 9 of the craft is supported by the broader angled body section 7 of the sheet 1, with the keel 50 of the craft being accommodated by the narrow angled tip section 6 of the sheet 1. The keel 50 is not in close contact with the tip section 6, and in this way is protected from receiving a direct force on impact of the deceleration sheet 1 with the water. The force of impact is transferred to the platform, and some will be transferred to the hull 9 of the mounted vessel 8. However, force transfer to the payload is minimised.

The cross members 3, 4, 5 are preferably movable in relation to the frame (not shown) and the sheet 1 in all embodiments of the invention, so as to alter the exact cross-section of the staged v and hence provide further tuning potential. Each load may have different requirements as far as deceleration profile is concerned—for example, for a particular load a stable landing may be more important than a gentle one. In that particular instance, the cross members 4 could be moved to provide a larger tip section 6, providing a more substantial 'keel' to the platform when it lies in the fluid. Preferably this adjustment allows any of the size, angle and number of the gradients, or diverging sections, to be altered. Attachment of the cross members 3, 4, 5 to the frame, and their adjustment mechanisms, can be of any type. For example, there may be several positions on the frame (not shown) at which the cross members 3, 4, 5 can be attached.

Figure 4:
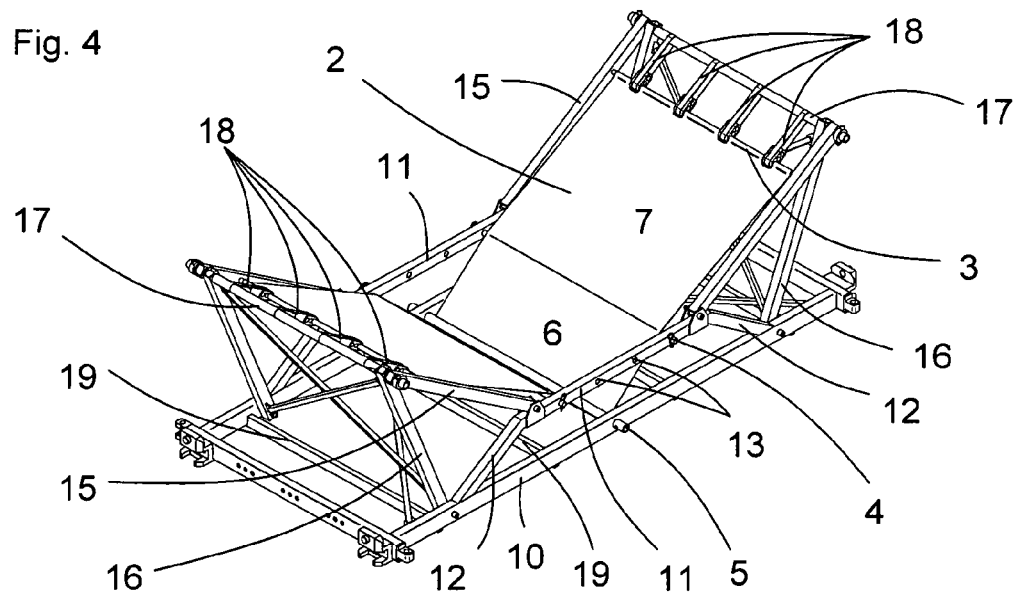
FIG. 4 shows the embodiment of the deceleration platform in more detail.

Thus, FIG. 4 shows one example of such a deceleration platform, in which the frame comprises a rectangular base 10 to which a series of struts are attached, such struts then acting as the mounting structures for the elements 3 and 4. The element 5 is mounted directly to the base 10 as shown in FIG. 4. Thus, a pair of struts 11 extend parallel to the sides of the base 10, at a predetermined spacing determined by inclined struts 12, with such parallel struts 11 then acting a the mounting location for the elements 4. As mentioned previously, the elements 4 may have more than one mounting position on the frame, and additional possible mounting points 13 can thus be seen in FIG. 4.

Respective pairs of inclined struts 15, 16 then define raised sides of the frame, those inclined struts 15, 16 supporting respective mounting bars 17 parallel to the short side of the base 10 and spaced therefrom. The mounting bars 17 are then connected to the elements 3 by tensioners 18. Those tensioners pull the elements 3 towards the mounting bars 17, thereby putting the sheeting section 2 under tension.

FIG. 4 also shows that there may be transverse struts 19 extending across the base to provide strengthening.

As can be appreciated from FIG. 4, when the deceleration platform is dropped, the base 10 will make first contact with water. However, the relatively thin profile of the struts forming the frame 10 offers little resistance, and thus the deceleration is provided by the sheeting cover 2 as previously described.

If a platform having more than two gradients, or diverging sections, in profile is considered, the deceleration profile of an object mounted on such a platform could be controlled even more precisely. However, the platforms of the present invention preferably have only two such gradients, such as the arrangement shown in FIG. 1 and FIG. 2, for ease of construction and alteration.

This preferred embodiment has been described by way of example and it will be apparent to those skilled in the art that many alterations can be made that are still within the scope of the invention.

Figure 5:
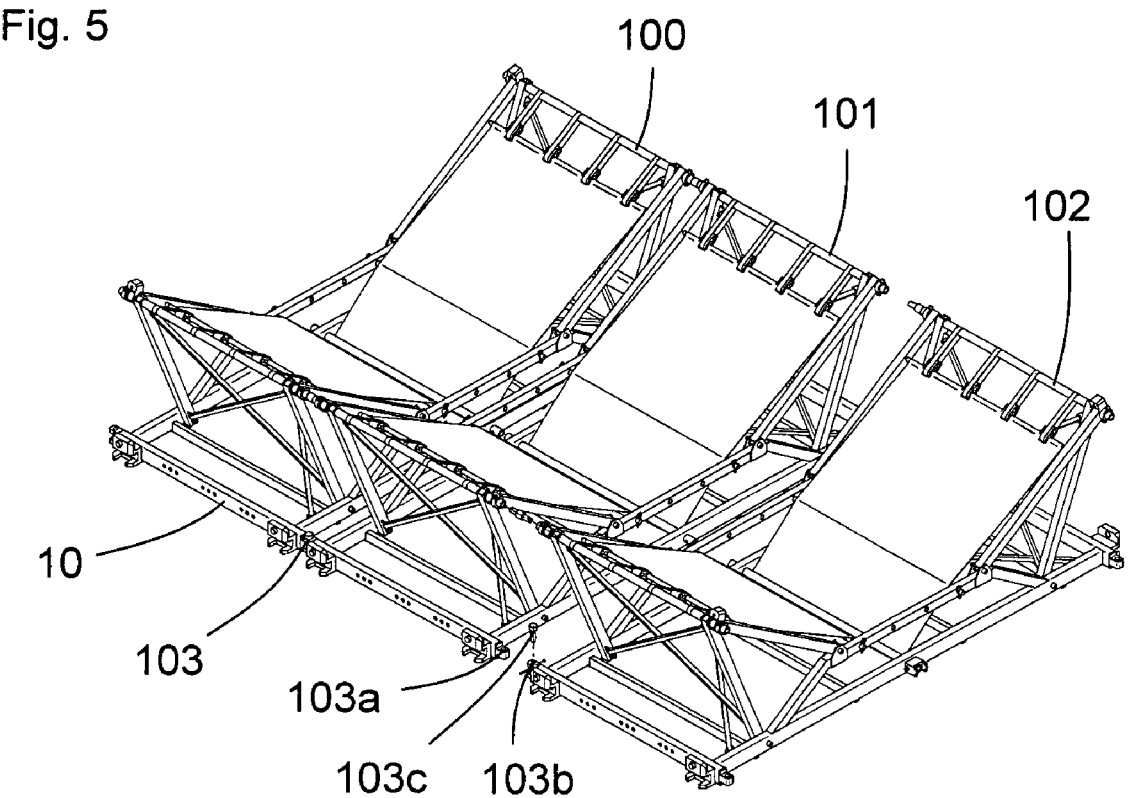
FIG. 5 shows multiple platforms interconnected for larger payloads.

For example, FIG. 5 illustrates the connection together of three platforms, to form a composite platform suitable for larger loads. Each of the three platforms 100, 101, 102 in FIG. 5 is the same as the platform shown in FIG. 4, and will thus not be described in detail. In FIG. 5, the platforms 100, 101 are secured together by connections 103 at the adjacent corners of the rectangular bases 10 of the platforms 100, 101. As shown between platforms 101 and 102, those connections 103 comprise a projection 103A which is received in a slot 103B, with the projection 103A and the slot 103B then being held together by a fastening 103C.

What is claimed is:

1. A deceleration platform for aerial delivery of payloads into aquatic environments, said platform comprising:
    a frame including a plurality of frame members defining a base, at least two of said frame members having bottom support surfaces which form a flat plane in order to support a remainder of the platform and the payload stably on a flat surface;
    a flexible sheet which is tensioned into planar sections by being stretched over and attached to said frame,
    said tensioned flexible sheet forming on said frame prior to payload loading two substantially continuous deceleration walls which converge downwardly to join at an intermediary lower tip end part,
    said planar sections of said deceleration walls and said tip end part together defining a staged v cross-section when viewed horizontally from one end thereof,
    said deceleration walls each having a first lower portion adjacent to said tip end part and a second higher portion extending from said first lower portion,
    said first lower portions of said deceleration walls together forming with respect to each other a first angle of divergence and, together with said tip end part, defining a lower tip section, and
    said second higher portions of said deceleration walls together forming with respect to each other a second angle of divergence and defining a body section,
    wherein said second angle of divergence is greater than said first angle of divergence and thus the staged v cross section is defined by the first and second angles of divergence.

2. The platform of claim 1, wherein said tip end part is pointed.

3. The platform of claim 1, wherein each of said deceleration walls has a sharp transition between said first lower portion and said second upper portion.

4. The platform of claim 1, wherein said frame has cross members supporting said flexible sheet, said cross members being positioned such that said flexible sheet defines said lower tip section and said body section.

5. The platform of claim 4, wherein said flexible sheet is adjustably tensionable on said frame.

6. The platform of claim 1:
    wherein each of said deceleration walls has a transition between said first lower portion and said second upper portion; and
    wherein said transitions are parallel to each other and to the lower tip end part.

7. A method of delivering a payload onto the surface of a fluid, comprising the steps of:
    initially constructing a deceleration platform including the steps of a) providing a frame including a plurality of frame members defining a base, at least two of said frame members having bottom support surfaces which form a flat plane in order to support a remainder of the platform and the payload stably on a flat surface, and b) tensioning and attaching a flexible sheet over said frame into planar sections so that the planar sections of said deceleration platform forms two substantially continuous deceleration walls which converge downwardly to join at an intermediary lower tip end part, said planar sections of said deceleration walls and said tip end part together defining a staged v cross-section when viewed horizontally from one end thereof, said deceleration walls each having a first lower portion adjacent to said tip end part and a second higher portion extending from said first lower portion, said first lower portions of said deceleration walls together forming with respect to each other a first angle of divergence and, together with said tip end part, defining a lower tip section, and said second higher portions of said deceleration walls together forming with respect to each other a second angle of divergence and defining a body section, wherein said second angle of divergence is greater than said first angle of divergence and thus the staged v cross section is defined by the first and second angles of divergence;
    mounting said payload onto the constructed deceleration platform; and
    dropping said platform onto the surface of said fluid such that said tip end part of said platform contacts said surface of said fluid before a remainder of said platform.

8. A deceleration platform for aerial delivery of payloads vertically into aquatic environments, said platform comprising:

an open frame formed by a plurality of frame members and having an open vertical profile which provides said open frame with only a little resistance to vertical entry into the aquatic environments relative to a substantial resistance of a remainder of the platform to vertical entry;

a flexible sheet which is tensioned into planar sections by being stretched over and attached to said open frame, said tensioned flexible sheet forming on said open frame prior to payload loading two substantially continuous deceleration walls which converge downwardly to join at an intermediary lower tip end part, said planar sections of said deceleration walls and said tip end part together defining a staged v cross-section when viewed horizontally from one end thereof, said deceleration walls each having a first lower portion adjacent to said tip end part and a second higher portion extending from said first lower portion, said first lower portions of said deceleration walls together forming with respect to each other a first angle of divergence and, together with said tip end part, defining a lower tip section, and said second higher portions of said deceleration walls together forming with respect to each other a second angle of divergence and defining a body section, wherein said second angle of divergence is greater than said first angle of divergence and thus the staged v cross section is defined by the first and second angles of divergence.

9. The platform of claim 8, wherein said tip end part is pointed.

10. The platform of claim 8, wherein each of said deceleration walls has a sharp transition between said first lower portion and said second upper portion.

11. The platform of claim 8, wherein said open frame has cross members supporting said flexible sheet, said cross members being positioned such that said flexible sheet defines said lower tip section and said body section.

12. The platform of claim 11, wherein said flexible sheet is adjustably tensionable on said frame.

13. The platform of claim 8:

wherein each of said deceleration walls has a transition between said first lower portion and said second upper portion; and wherein said transitions are parallel to each other and to the lower tip end part.

* * * * *